United States Patent
Ono

(10) Patent No.: US 8,134,610 B2
(45) Date of Patent: Mar. 13, 2012

(54) IMAGE CAPTURING APPARATUS, IMAGE CAPTURING METHOD, IMAGE PROCESSING APPARATUS, IMAGE PROCESSING METHOD, AND PROGRAM STORING MEDIUM USING SPATIAL FREQUENCY TRANSFER CHARACTERISTICS

(75) Inventor: Shuji Ono, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 504 days.

(21) Appl. No.: 12/364,957

(22) Filed: Feb. 3, 2009

(65) Prior Publication Data

US 2009/0201387 A1    Aug. 13, 2009

(30) Foreign Application Priority Data

Feb. 5, 2008  (JP) ................................. 2008-025707
Jan. 16, 2009  (JP) ................................. 2009-007775

(51) Int. Cl.
*H04N 5/228* (2006.01)
(52) U.S. Cl. ........................ 348/222.1; 348/235; 348/241
(58) Field of Classification Search ............... 348/222.1, 348/235, 241
See application file for complete search history.

(56) References Cited

U.S. PATENT DOCUMENTS

| 2001/0030707 | A1* | 10/2001 | Fujii | 348/335 |
| 2007/0263929 | A1* | 11/2007 | Kaji | 382/168 |
| 2009/0219416 | A1* | 9/2009 | Tsuruoka | 348/241 |
| 2010/0208993 | A1* | 8/2010 | Sambongi | 382/170 |

FOREIGN PATENT DOCUMENTS

| JP | 2526826 B2 | 6/1996 |
| JP | 2006-519527 A | 8/2006 |

* cited by examiner

*Primary Examiner* — Gevell Selby
(74) *Attorney, Agent, or Firm* — Sughrue Mion, PLLC

(57) ABSTRACT

An image capturing apparatus includes an optical system that forms an image of light and a gradation processing section that converts gradation of a captured image captured through the optical system in accordance with a spatial frequency transfer characteristic of the optical system. The image capturing apparatus may further include a light receiving section that receives light from a subject through the optical system, and the gradation processing section may convert gradation of a captured image obtained by light received by the light receiving section in accordance with a spatial frequency transfer characteristic at the position at which the light receiving section is provided.

26 Claims, 11 Drawing Sheets

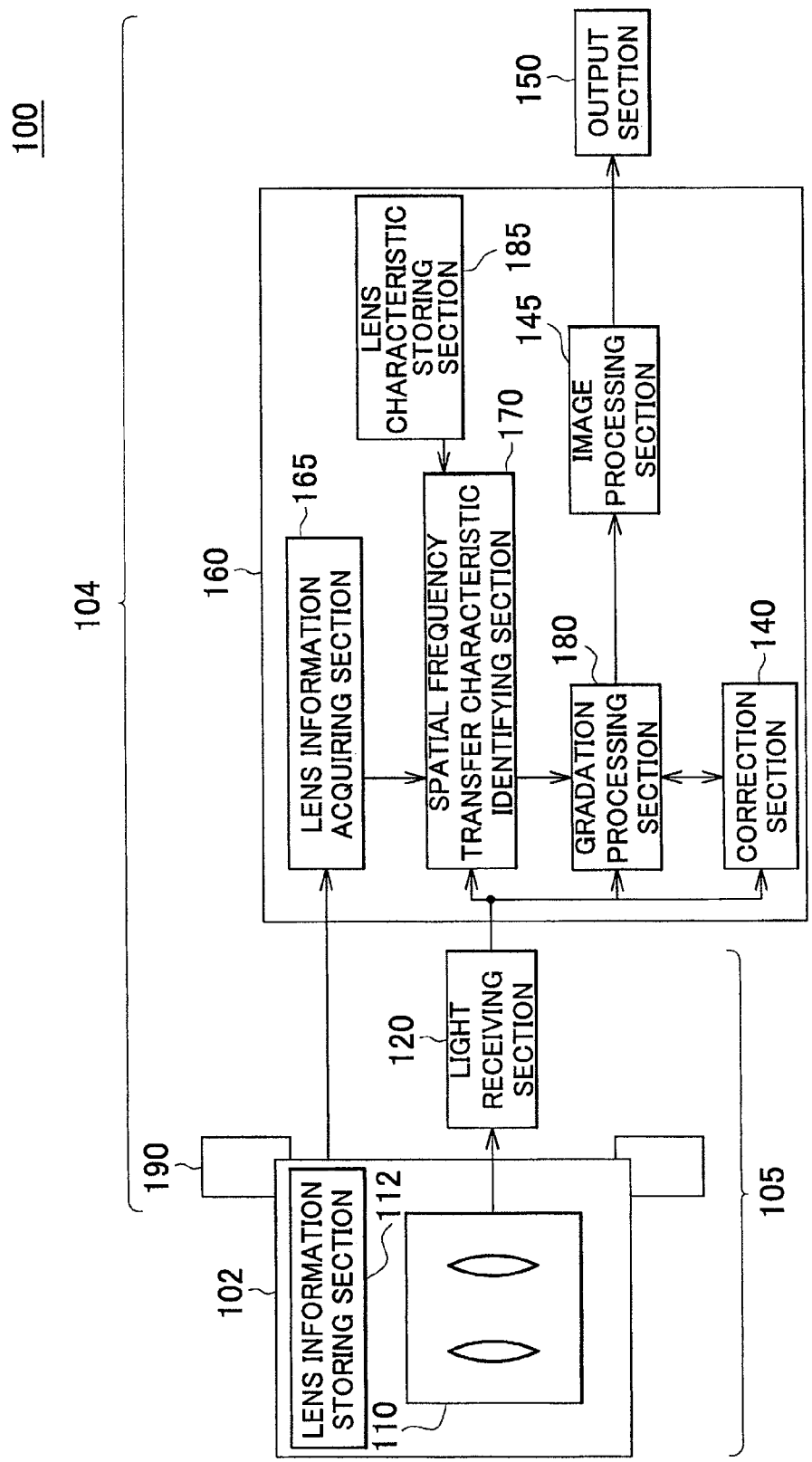
F I G. 1

185

| LENS ID | OTF DATA |
|---------|----------|
| #601 | OTF DATA1 |
| #602 | OTF DATA2 |
| ⋮ | ⋮ |

FIG. 6

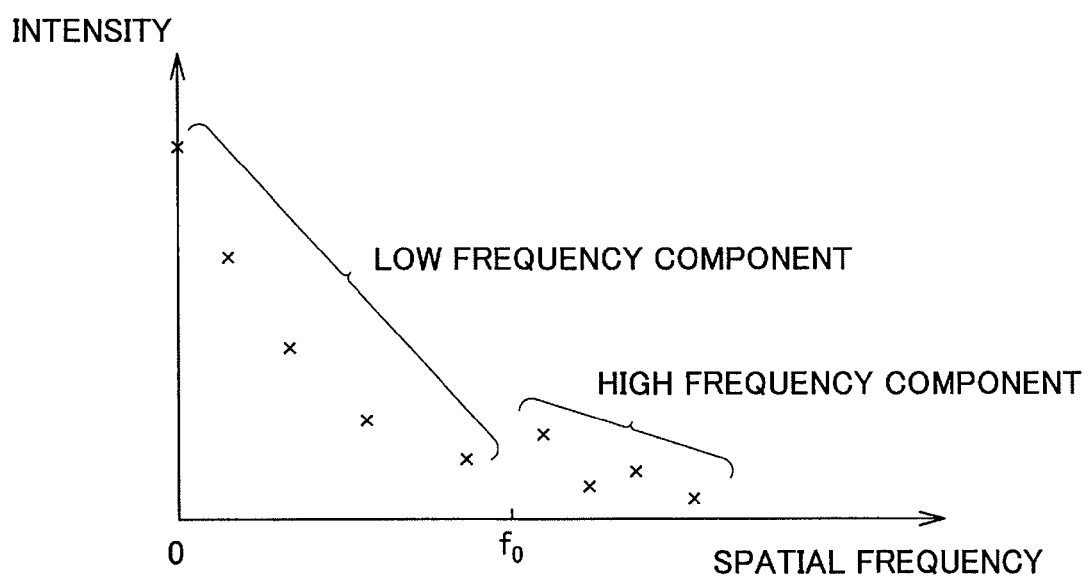
F I G . 7

IMAGE CAPTURING APPARATUS, IMAGE CAPTURING METHOD, IMAGE PROCESSING APPARATUS, IMAGE PROCESSING METHOD, AND PROGRAM STORING MEDIUM USING SPATIAL FREQUENCY TRANSFER CHARACTERISTICS

CROSS REFERENCE TO RELATED APPLICATION

The present application claims priority from Japanese Patent Applications No. 2008-025707 filed on Feb. 5, 2008 and No. 2009-007775 filed on Jan. 16, 2009, the contents of which are incorporated herein by reference.

BACKGROUND

1. Field of the Invention

The present invention relates to an image capturing apparatus, an image capturing method, an image processing apparatus, an image processing method, and a computer readable medium storing a program. More particularly, the present invention relates to an image capturing apparatus and an image capturing method for capturing an image, an image processing apparatus and an image processing method for processing a captured image, and a computer readable medium storing a program for the image capturing apparatus and the image processing apparatus.

2. Related Art

A technique for automatically enlarging a diaphragm aperture in accordance with the selection of soft photography has been known as disclosed, for example, in Japanese Patent No. 2526826. Moreover, a camera including an object lens having PSF (point spread function) larger than two times of a pitch of a light receiving element array has been known as disclosed, for example, in Japanese Publication of a Translation of an International Application 2006-519527.

Like techniques as described in Japanese Patent No. 2526826 and Japanese Publication of a Translation of an International Application 2006-519527, since a pixel value spatially averaged is obtained if the image of a subject is captured to become dim, the maximum value of brightness may fall down and the minimum value of brightness may rise compared to the case that an in-focus image is usually captured. In this case, bit values may not be effectively used in some cases when pixel values are expressed with the same dynamic range as that during usual photography.

SUMMARY

Therefore, it is an object of an aspect of innovation included in the present specification to provide an image capturing apparatus, an image capturing method, an image processing apparatus, an image processing method, and a computer readable medium storing a program that can solve the foregoing problems. The above and other objects can be achieved by combinations described in the independent claims. The dependent claims define further advantageous and exemplary combinations of the present invention.

According to an exemplary image capturing apparatus by an aspect related to innovation included in the present specification, the image capturing apparatus includes: an optical system that forms an image of light and a gradation processing section that converts gradation of a captured image captured through the optical system in accordance with a spatial frequency transfer characteristic of the optical system.

According to an exemplary image capturing method by an aspect related to innovation included in the present specification, the image capturing method includes: converting gradation of a captured image captured through an optical system forming an image of light in accordance with a spatial frequency transfer characteristic of the optical system.

According to an exemplary computer readable medium storing a program by an aspect related to innovation included in the present specification, the program makes a computer functions as a gradation processing section that converts gradation of a captured image captured through an optical system forming an image of light in accordance with a spatial frequency transfer characteristic of the optical system.

According to an exemplary image processing apparatus by an aspect related to innovation included in the present specification, the image processing apparatus includes: a spatial frequency transfer characteristic identifying section that identifies a spatial frequency transfer characteristic of an image capturing section on the basis of a spatial frequency component of a captured image captured by the image capturing section; and a gradation processing section that converts gradation of the captured image in accordance with the spatial frequency transfer characteristic identified by the spatial frequency transfer characteristic identifying section.

According to an exemplary image processing method by an aspect related to innovation included in the present specification, the image processing method includes: identifying a spatial frequency transfer characteristic of an image capturing section on the basis of a spatial frequency component of a captured image captured by the image capturing section; and converting gradation of the captured image in accordance with the spatial frequency transfer characteristic identified in the spatial frequency transfer characteristic identifying step.

According to an exemplary computer readable medium storing a program for an image processing apparatus by an aspect related to innovation included in the present specification, the program makes a computer function as: a spatial frequency transfer characteristic identifying section that identifies a spatial frequency transfer characteristic of an image capturing section on the basis of a spatial frequency component of a captured image captured by the image capturing section; and a gradation processing section that converts gradation of the captured image in accordance with the spatial frequency transfer characteristic identified by the spatial frequency transfer characteristic identifying section.

The summary does not necessarily describe all necessary features of the present invention. The present invention may also be a sub-combination of the features described above.

BRIEF DESCRIPTION OF THE DRAWINGS

FIG. 1 is a view exemplary showing a block configuration of an image capturing apparatus 104 according to an embodiment.

FIG. 6 is a view exemplary showing lens characteristic information stored on a lens characteristic storing section 185.

FIG. 7 is a view exemplary showing a spatial frequency component obtained by analyzing the spatial frequency of a captured image.

DESCRIPTION OF EXEMPLARY EMBODIMENTS

Figure 2:
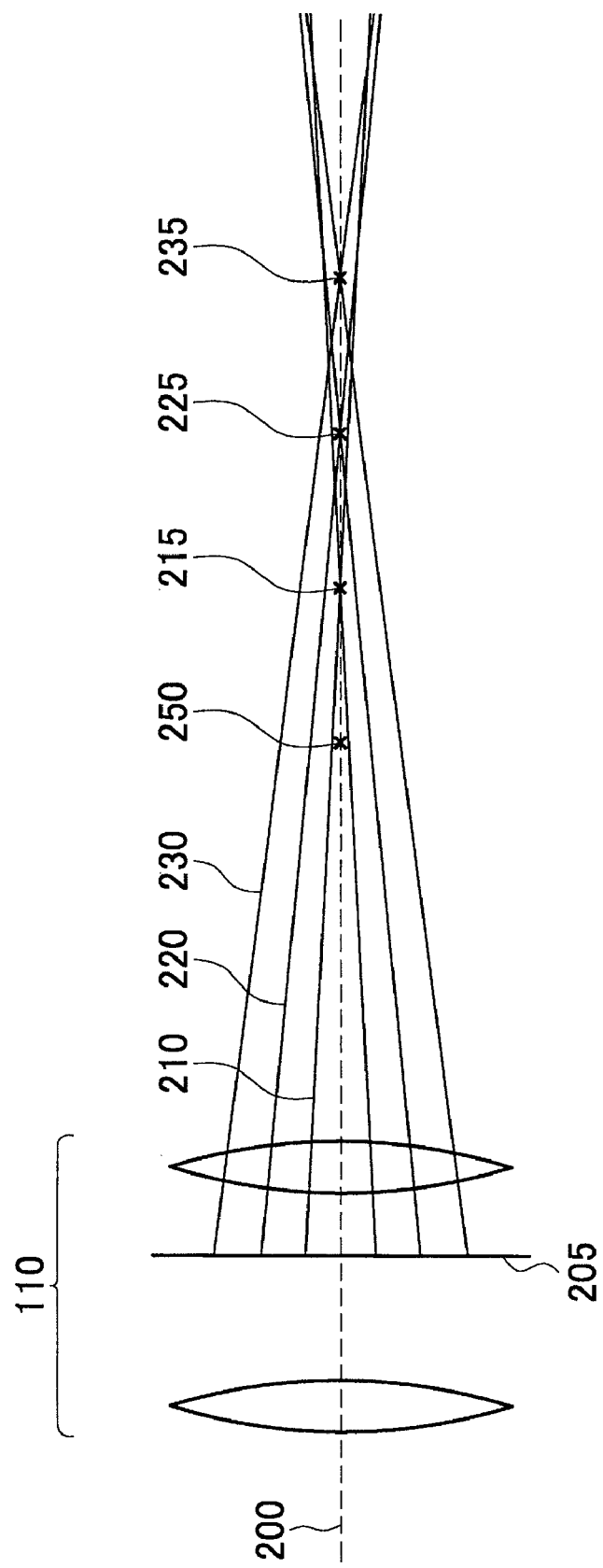
FIG. 2 is a view exemplary typically showing an optical characteristic of a lens system 110.

The embodiments of the invention will now be described based on the preferred embodiments, which do not intend to limit the scope of the present invention, but just exemplify the invention. All of the features and the combinations thereof described in the embodiment are not necessarily essential to the invention.

FIG. 1 shows an example of a block configuration of an image capturing apparatus 104 according to an embodiment. The image capturing system 100 includes an optical unit 102 and an image capturing apparatus 104. The optical unit 102 is an example of an optical system that forms an image of light and has a lens system 110 and a lens information storing section 112. The image capturing apparatus 104 has a light receiving section 120 that receives light passing through the lens system 110, an image generating section 160, and an output section 150. The image generating section 160 includes a lens information acquiring section 165, a lens characteristic storing section 185, a spatial frequency transfer characteristic identifying section 170, a gradation processing section 180, a correction section 140, and an image processing section 145. In addition, the light receiving section 120 functions as an image capturing section 105 of the present invention.

The optical unit 102 having the lens system 110 can be attached and detached to and from a mounting section 190. The mounting section 190 can mount thereto the optical unit 102 so that the light receiving section 120 receives light through any one of a plurality of optical units 102 having different optical characteristics. In addition, an example of an optical characteristic of the lens system 110 included in the optical unit 102 capable of being mounted on the image capturing apparatus 104 will qualitatively be described with reference to FIG. 2.

The lens information storing section 112 stores lens information. For example, lens information can include ID information identifying the lens system 110. In addition, the lens information storing section 112 may be realized by a non-volatile memory or the like.

The light receiving section 120 receives light from a subject through the lens system 110. Specifically, the light receiving section 120 has a plurality of light receiving elements that are arranged in a two dimensional manner. The plurality of light receiving elements receive light collected by the lens system 110 of the optical unit 102 that is mounted on the mounting section 190.

The image generating section 160 generates an output image on the basis of the amount of received light received by the light receiving section 120. The output image generated by the image generating section 160 is supplied to the output section 150.

Specifically, the lens information acquiring section 165 acquires the lens information stored on the lens information storing section 112 of the optical unit 102 that is mounted on the mounting section 190. For example, the lens information acquiring section 165 reads ID information identifying the lens system 110 from the lens information storing section 112.

The lens characteristic storing section 185 stores optical characteristic data identifying an optical characteristic of the lens system 110 in association with the ID information identifying the lens system 110. For example, the optical characteristic data can include information showing a spatial frequency transfer characteristic of the lens system 110. The spatial frequency transfer characteristic identifying section 170 identifies information showing the spatial frequency transfer characteristic of the lens system 110 that is stored on the lens characteristic storing section 185, in association with the ID information acquired by the lens information acquiring section 165. In this manner, the spatial frequency transfer characteristic identifying section 170 acquires the information showing the spatial frequency transfer characteristic of the lens system 110 mounted on the mounting section 190 and thus identifies the spatial frequency transfer characteristic of the lens system 110.

In this way, the spatial frequency transfer characteristic identifying section 170 acquires the information showing the spatial frequency transfer characteristic of the lens system 110 and thus identifies the spatial frequency transfer characteristic of the lens system 110. Besides, the spatial frequency transfer characteristic identifying section 170 may identify the spatial frequency transfer characteristic of the image capturing section 105 on the basis of the spatial frequency component of the captured image captured by the image capturing section 105. For example, the spatial frequency transfer characteristic identifying section 170 may identify the spatial frequency transfer characteristic of the image capturing section 105 from the analysis result obtained by analyzing the spatial frequency of the captured image. For example, the spatial frequency transfer characteristic identifying section 170 may identify a spatial frequency transfer characteristic as being higher when a higher spatial frequency component in a captured image is larger. Besides, the spatial frequency transfer characteristic identifying section 170 may identify a spatial frequency transfer characteristic as being higher when a spatial frequency component of a predetermined high frequency domain in a captured image is larger than a spatial frequency component of a predetermined low frequency domain.

The gradation processing section 180 converts the gradation of the captured image obtained by light received by the light receiving section 120 in accordance with the spatial frequency transfer characteristic at the position at which the light receiving section 120 is provided. In addition, the captured image processed by the gradation processing section 180 may be a captured image based on the amount of light received by the light receiving section 120 or a captured image corrected by the correction section 140. Specifically, the gradation processing section 180 converts a captured image into an image having a dynamic range having a size determined by the spatial frequency transfer characteristic of the lens system 110. More specifically, the gradation processing section 180 converts a captured image into an image having a smaller dynamic range when the spatial frequency transfer characteristic of the high frequency domain is lower.

In addition, the above high frequency domain may be a predetermined frequency domain.

Specifically, the gradation processing section 180 corrects a captured image in accordance with the spatial frequency transfer characteristic of the lens system 110 identified by the spatial frequency transfer characteristic identifying section 170. The gradation processing section 180 may specifically convert a captured image into an image having a smaller dynamic range when the spatial frequency transfer characteristic identified by the spatial frequency transfer characteristic identifying section 170 is larger in the high frequency domain. More specifically, the gradation processing section 180 may perform a gamma correction on a captured image in order to convert the captured image into an image having a smaller dynamic range when the spatial frequency transfer characteristic of the high frequency domain is lower. In this manner, the gradation processing section 180 converts the gradation of the captured image captured through the lens system 110 in accordance with the spatial frequency transfer characteristic of the lens system 110 identified by the spatial frequency transfer characteristic identifying section 170.

The correction section 140 corrects an image that is obtained by converting from analog to digital the amount of light respectively received by the plurality of light receiving elements. For example, the correction section 140 corrects an image on the basis of the value of the amount of received light converted from analog to digital, the position of each light receiving element, and the optical transfer function of the lens system 110. In this manner, the correction section 140 corrects a captured image obtained by light received by the light receiving section 120 on the basis of the optical transfer function of the lens system 110. Then, the captured image corrected by the correction section 140 is supplied to the gradation processing section 180, and a gradation process is performed on the captured image.

In this manner, the gradation processing section 180 converts the gradation of the captured image captured through the optical system in accordance with the spatial frequency transfer characteristic of the lens system 110. For this reason, the image capturing apparatus 104 can effectively utilize bit width indicating a pixel value in accordance with a blurring amount included in the captured image.

The image processing section 145 performs an image processing on the image corrected by the correction section 140. For example, the image processing performed by the image processing section 145 can include a color balancing process, a color synchronizing process, an outline correcting process, a color correcting process, or the like. In this manner, the image processing section 145 converts the pixel value of the image corrected by the correction section 140 into a value nonlinear to the amount of received light of the light receiving element.

The output section 150 outputs the output image obtained by being processed by the correction section 140 and the image processing section 145. For example, the output section 150 may display an output image. Moreover, the output section 150 may record an output image in a recording medium. In addition, the output section 150 may send an output image through a communication line. The output section 150 may further compress an output image and output the compressed output image.

In this manner, the image capturing apparatus 104 may be an image capturing device a lens of which can be replaced. For example, the image capturing apparatus 104 may be an image capturing device such as a single-lens reflex camera, and the optical unit 102 may be an interchangeable lens for a single-lens reflex camera. The image capturing apparatus 104 may also be an endoscope. The optical unit 102 may be replaced in a turret manner and then be mounted on the mounting section 190.

FIG. 2 typically shows an example of an optical characteristic of the lens system 110. Specifically, FIG. 2 typically shows trajectories of three beams 210, 220, and 230 that are incident on different positions on an optical axis 200 from an incidence pupil 205, among beams incident on the lens system 110 from the object point on the optical axis. As shown in the drawing, the beams 210, 220, and 230 are incident at the positions close to the incidence pupil 205 on the optical axis 200 in this order.

As shown in the drawing, the beam 210 crosses with the optical axis 200 at a position 215 that is distant from the lens system 110 and is farther than a paraxial focus position 250 in the optical axis direction. This is performed by the lens system 110. The beam 230 that is incident at a position most distant from the lens system 110 also crosses with the optical axis 200 at a position 235 that is distant from the lens system 110 and is farther than the position 215 in the optical axis direction. This is performed by the lens system 110. In addition, the beam 220 crosses with the optical axis 200 at a position 225 between the position 215 and the position 235. This is also performed by the lens system 110.

As shown in the drawing, it is expected that the spread of light by the lens system 110 has substantially the same size between the position 215 and the position 235. In this manner, the lens system 110 has excessively-corrected spherical aberration, and forms an image of light at a position substantially farther than the paraxial focus position 250. For this reason when, the lens system 110 can increase a distance in the optical axis direction at which the spread of light from the object point has a substantially uniform size regardless of the position of image face in the optical axis direction, compared to the case that spherical aberration is not excessively corrected.

In this manner, if the distance in the optical axis direction becomes longer, the position of image face at which the spread of light has a substantially uniform size can exist for light from the object point existing in the wider range from the lens system 110. When the light receiving section 120 is provided at the position of image face, an optical transfer function at the position at which the light receiving section 120 is provided has substantially the same regardless of the distance between the optical system and the object point. In this manner, in the lens system 110, the optical transfer function for light from the object point has substantially the same regardless of the distance between the optical system and the object point according to the described aberration characteristic.

As above, the optical characteristic of the lens system 110 has been qualitatively described by means of FIG. 2. In addition, a schematic block diagram of the lens system 110 shown in FIG. 2 has been made for the purpose of qualitatively understanding the optical characteristic of the lens system 110, and thus this drawing has not been made in accordance with the real scale.

Figure 3:
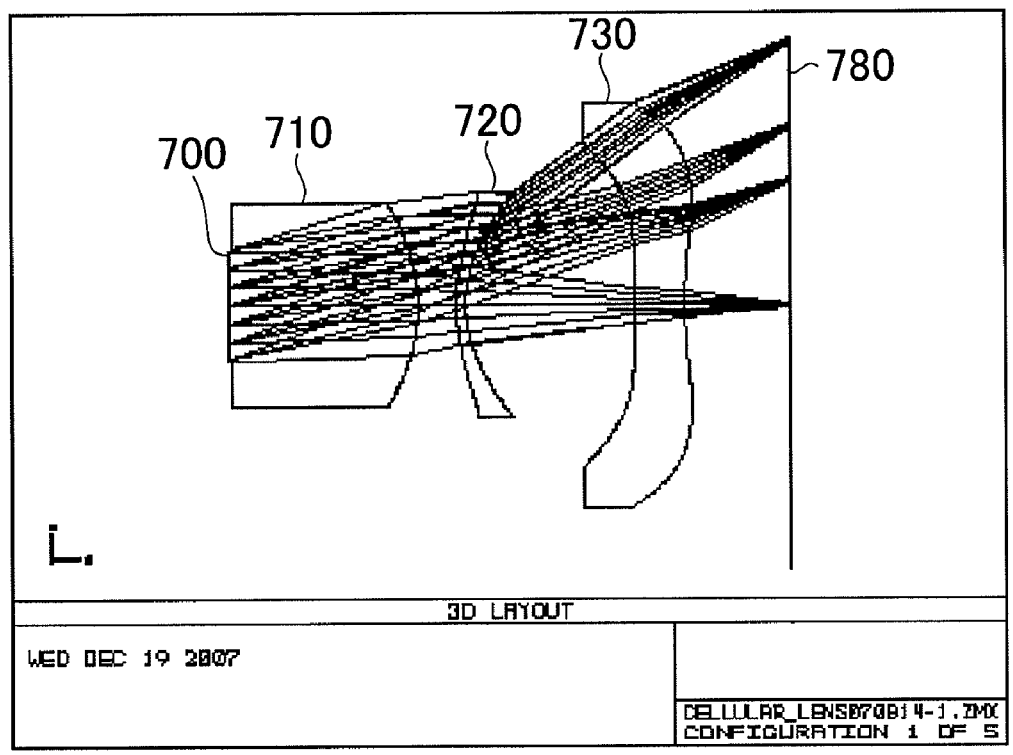
FIG. 3 is a view showing a configuration example of the lens system 110.

FIG. 3 shows an example of a configuration of the lens system 110. The lens system 110 has a diaphragm 700, a lens 710, a lens 720, and a lens 730. An image face is shown with the reference number 780. In addition, FIG. 3 shows a plurality of beams in piles in the lens system 110. Hereinafter, it will be described about the arrangement and optical characteristics of the lens 710, the lens 720, and the lens 730.

The refractive indexes of the lens 710 and the lens 730 are respectively 1.53128710, 1.52470166, and 1.52196091 with respect to light of wavelength 486.133 nm, wavelength 587.562 nm, and wavelength 656.273 nm. The refractive index of the lens 720 is respectively 1.59943869, 1.58546992, and 1.57986377 with respect to light of wavelength 486.133 nm, wavelength 587.562 nm, and wavelength 656.273 nm. The diaphragm 700 is also provided at a position distant from the vertex of the lens 710 by 0.001566661 mm at the image face side.

The thickness of the lens 710 is 1.987091 mm. In the present specification, the thickness indicates the length in the optical axis direction of the lens. The radius of curvature of an object-side surface of the lens 710 is 15.48676 mm, the radius of cross section of the object side is 1.188941 mm, and the conical constant of the object-side surface is −90378.4. In addition, the radius of curvature of an image-side surface of the lens 710 is −12.09038 mm, the radius of cross section of the image side is 2.14803 mm, and the conical constant of the object side surface is 28.79374. When the radius of curvature is negative in the description of the present drawing, it shows that the surface shape is a concave surface against light.

The lens 720 is provided at a position distant from the lens 710 by the distance 0.4005282 mm in the image surface direction. In the description of the present drawing, the distance between lenses indicates the distance between the image-side surface of an object-side lens and the object-side surface of an image-side lens on the optical axis. The thickness of the lens 720 is 0.09214797 mm. In addition, the radius of curvature of the object-side surface of the lens 720 is 2.114035 mm, the radius of cross section of the object-side surface is 2.38122 mm, and the conical constant of the object-side surface is −0.3929276. The radius of curvature of the image-side surface of the lens 720 is 1.119414 mm, the radius of cross section of the image side is 2.362124 mm, and the conical constant of the image-side surface is −2.780465.

The lens 730 is provided at a position distant from the lens 720 by the distance 1.770789 mm in the image surface direction. The thickness of the lens 730 is 0.5204438 mm. In addition, the radius of curvature of the object-side surface of the lens 730 is −0.6002893 mm, the radius of cross section of the object-side surface is 3.486572 mm, and the conical constant of the object-side surface is −958.9289. The curvature radius of the image-side surface of the lens 730 is −0.3018179 mm, the radius of cross section of the image side is 4.262504 mm, and the conical constant of the image-side surface is −465.3071. Further, the image face is provided at a position distant from the lens 730 by the distance 1.1 mm.

In this manner, the plurality of lenses 710, 720, and 730 are provided to array the central axes of the lenses on the same axis. Therefore, the lens system 110 has rotation symmetry with respect to the optical axis.

The absolute value of the difference between the angle of the normal line of the image face and the angle at which key light is incident on the image face is smaller than a predetermined value in order to reduce the computation error of the optical transfer function of the lens system 110 compared to the predetermined value. In this manner, since a telecentric property of the lens system 110 is increased, the computation error of the optical transfer function can be reduced. For example, when computing MTF, MTF can be computed with a sufficiently small error even by FFT. For this reason, it is possible to restore image blurring by the lens system 110 at high speed.

Figure 4:
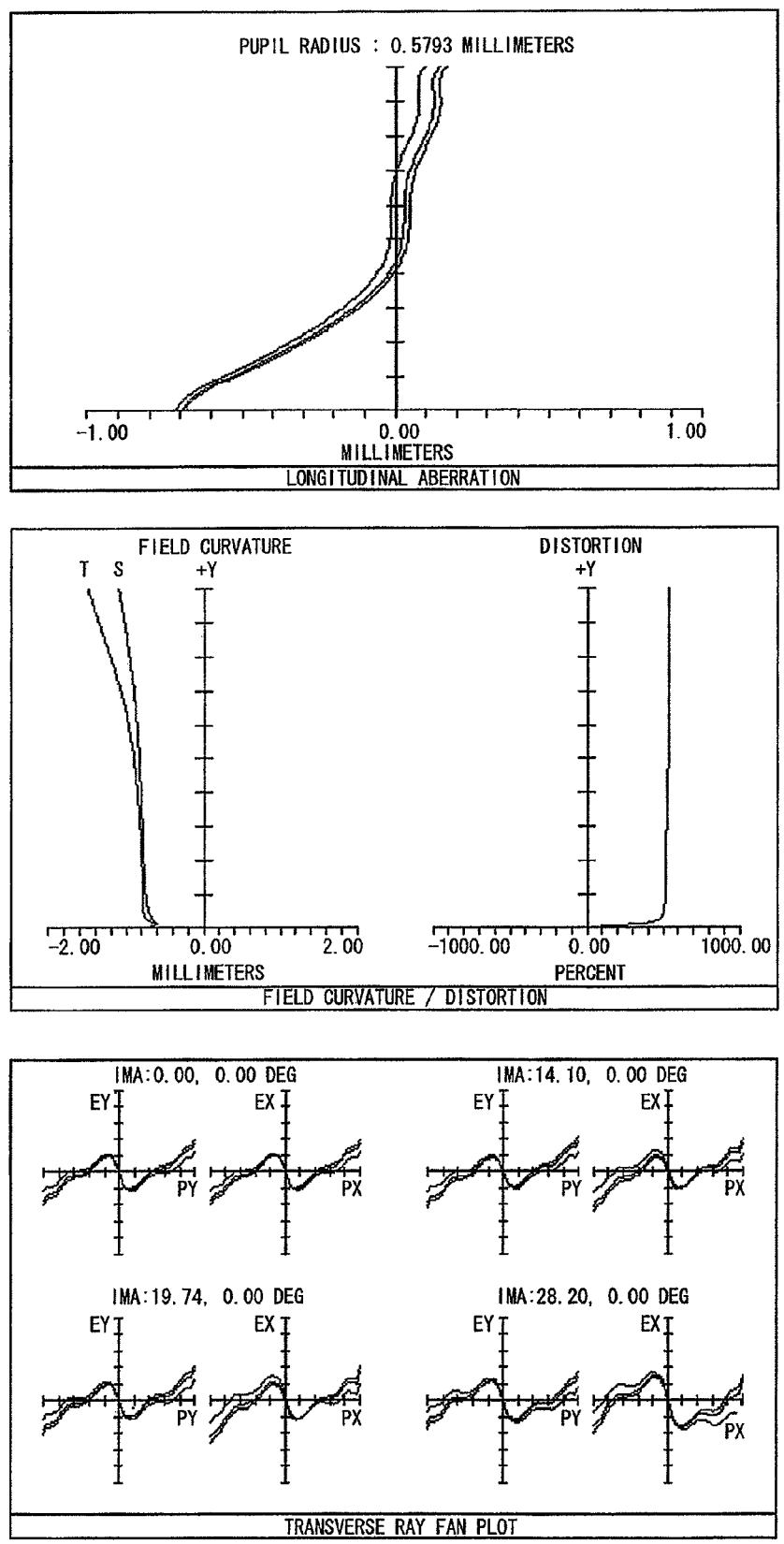
FIG. 4 is a view showing an aberration characteristic of the lens system 110 shown in FIG. 3.

FIG. 4 shows an aberration characteristic of the lens system 110 shown in FIG. 3. FIG. 4 sequentially shows a spherical aberration diagram, an astigmatism and distortion aberration diagram, and a lateral aberration diagram from the top. As shown in the spherical aberration diagram positioned at the highest stage, the spherical aberration of the lens system 110 shown in FIG. 3 is excessively corrected. In the present drawing, it should be noted that the horizontal axis of the spherical aberration diagram shows the position relative to the set image face and does not show the position relative to the paraxial focus.

As shown in the drawing, longitudinal aberration has a positive value over the entire surface of the image face. In other words, the value of longitudinal aberration has a positive value with respect to light at least incident on the range between a first incidence position and the optical axis. The first incidence position is at the position distant from the optical axis by a first distance on the incidence pupil of the lens system 110.

FIG. 4 shows a graph showing lateral aberration at a plurality of image-heights at the lowest stage. The upper-left graph shows a lateral aberration diagram on the optical axis and the upper-right graph shows a lateral aberration diagram when the height of image is 14.10 mm. In addition, the lower-left graph shows a lateral aberration diagram when the height of image is 19.74 mm and the lower-right graph shows a lateral aberration diagram when the height of image is 28.20 mm. In this manner, the lateral aberration of the lens system 110 shows substantially the same shape at all the heights of image.

Figure 5:
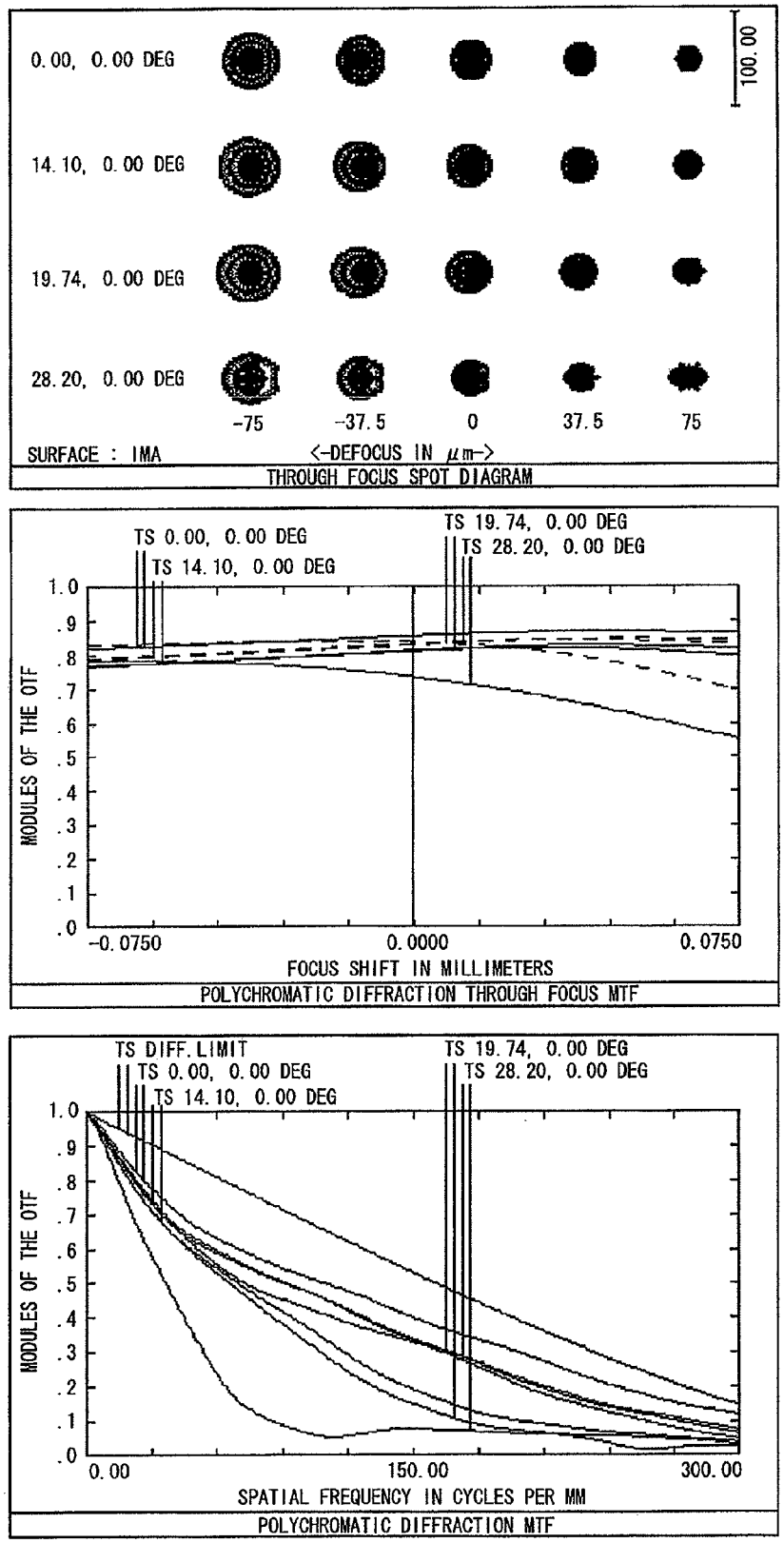
FIG. 5 is a view showing an optical transfer characteristic of the lens system 110 shown in FIG. 3.

FIG. 5 shows the optical transfer characteristic of the lens system 110 shown in FIG. 3. FIG. 5 sequentially shows a spot diagram view showing the height of image and defocusing dependency of a spot diagram, the defocusing dependency of MTF, and the spatial frequency characteristic of MTF from the top.

The spot diagram view positioned at the highest stage shows spot diagrams with respect to a plurality of different heights of image and a plurality of different defocusing amounts. In the present spot diagram view, the plurality of spot diagrams having the plurality of different defocusing amounts at the same height of image are arrayed in a transverse direction. The plurality of spot diagrams having the plurality of different heights of image in the same defocusing amount are arrayed in a longitudinal direction.

As shown by the height of image with a numeric value at the left of each spot diagram, the present spot diagram view includes spot diagrams having the heights of image of the positions distant from the optical axis by the distances 14.10 mm, 19.74 mm, and 20.20 mm on the optical axis. In addition, as shown by the defocusing amount with a numeric value under each spot diagram, the present spot diagram view includes spot diagrams positioned at the position distant from the set image face by the distance −75 μm, the position distant from the image face by the distance −37.5 μm, the position of the image face, the position distant from the image face by the distance 37.5 μm, and the position distant from the image face by the distance 75 μm.

As shown by the present spot diagram view, the spread of spot diagrams has substantially the same at least over the positions of image face in a predetermined range in the optical axis direction regardless of the height of image. In this manner, the spread of light from the object point by the lens system 110 has substantially the same over the positions of image face in the predetermined range in the optical axis direction. The spread of light may be the spread of the spot diagram as shown in the present drawing, or may be the spread of light shown by a point spread function. In this way, the spread of light from the object point by the lens system 110 is substantially uniform regardless of the height of image, and thus the spread of light from the object point by the lens system 110 is substantially uniform at least over the positions of image face in the predetermined range in the optical axis direction.

As shown by the graph of the defocusing dependency of MTF positioned at the middle stage of the present drawing, the plurality of heights of image, sagittal rays, and meridional rays have a distribution of substantially the same MTF value. In this case, MTF shows substantially the same value at least within the range of defocusing shown by the graph. In this manner, the MTF of the lens system 110 has substantially the same value over the wide defocusing range.

As shown by the graph of the spatial frequency characteristic of MTF positioned at the lowest stage of the present drawing, the lens system 110 has substantially the same MTF frequency characteristic for the plurality of heights of image, the sagittal rays, and the meridional rays. In this way, the MTF of the lens system 110 is substantially uniform regardless of the height of image. In addition, it may be said that the MTF of the lens system 110 is substantially uniform over the positions of image face in the predetermined range in the optical axis direction.

In this way, the lens system 110 spreads light from the object point to have a substantially uniform size in the light receiving section 120 regardless of the distance between the optical system and the object point, and thus has substantially the same optical transfer function of the lens system 110 for light from the object point regardless of the distance between the optical system and the object point. Specifically, the lens system 110 spreads light from the object point to a size larger than the pitch of the plurality of light receiving elements included in the light receiving section 120 regardless of the distance between the optical system and the object point. As described below, when the lens system 110 spreads light from the object point to be larger, the gradation processing section 180 converts the captured image into an image having a smaller dynamic range. For example, the gradation processing section 180 converts the captured image into an image having a smaller dynamic range when it is detected that the lens system 110 described with reference to FIGS. 3 to 5 is mounted on the mounting section 190. In addition, the spread of light by the lens system 110 changes by changing the zooming or diaphragm. Therefore, the gradation processing section 180 may convert the gradation of the captured image in accordance with at least one of a zooming value and a diaphragming value.

FIG. 6 shows an example of lens characteristic information stored on the lens characteristic storing section 185. The lens characteristic storing section 185 stores optical transfer function data (OTF data1, OTF data2, ... ) that are an example of the spatial frequency transfer characteristic of the lens system 110 identified with lens ID in association with the lens ID that is an example of ID information identifying the lens system 110. In this case, OTF data may be an optical transfer function, or may be data indicating the spatial frequency characteristic of MTF as shown at the lowest stage shown in FIG. 5.

Then, the spatial frequency transfer characteristic identifying section 170 acquires OTF data stored on the lens characteristic storing section 185 in association with the lens ID read from the lens information storing section 112 by the lens information acquiring section 165. The spatial frequency transfer characteristic identifying section 170 then identifies a spatial frequency transfer characteristic by analyzing an optical response indicated by the OTF data.

For example, according to the lens system 110 described with reference to FIGS. 3 to 5, MTF remarkably becomes lower than diffraction limit particularly in the high frequency domain as shown by the spatial frequency characteristic view of MTF positioned at the lowest stage illustrated in FIG. 5. This means that the obtained captured image becomes dim. Since the pixel value of the blurred captured image has an amount of light spatially averaged, the difference between the maximum luminance value and the minimum luminance value in the blurred captured image is expected to be smaller compared to the non-blurred captured image in which the same subject is captured.

Therefore, when digitally expressing the pixel value of the captured image with the predetermined number of bits, it is preferred that the dynamic range of the blurred captured image becomes smaller than that of the non-blurred captured image from a viewpoint that the number of bits is effectively utilized. When the spatial frequency transfer characteristic identified by the spatial frequency transfer characteristic identifying section 170 is lower in the high frequency domain as described above, the number of bits can be effectively utilized because the image capturing apparatus 104 can adjust a gamma process or the like and thus reduce a dynamic range. In addition, the spatial frequency transfer characteristic stored on the lens characteristic storing section 185 is not limited to the OTF data shown in the present drawing, and thus may be a characteristic showing the spatial frequency dependency of the optical response of the lens system 110.

FIG. 7 shows an example of the spatial frequency component obtained by analyzing the spatial frequency of the captured image. As shown in the present drawing, a frequency domain is divided into a low frequency domain lower than a frequency f0 and a high frequency domain higher than the frequency f0 using the predetermined frequency f0 as a boundary. For example, the spatial frequency transfer characteristic identifying section 170 judges whether a frequency component larger than a predetermined value is present among frequency components of the high frequency domain higher than the frequency f0.

When the spatial frequency transfer characteristic identifying section 170 judges that a frequency component larger than a predetermined value is present, the gradation processing section 180 converts a captured image into a image having a dynamic range smaller than a predetermined dynamic range. In addition, the spatial frequency transfer characteristic identifying section 170 may compute the maximum value of the frequency component of the high frequency domain. Then, the gradation processing section 180 may convert a captured image into an image having a dynamic range that is previously determined in association with the maximum value of the frequency component computed by the spatial frequency transfer characteristic identifying section 170.

Figure 8:
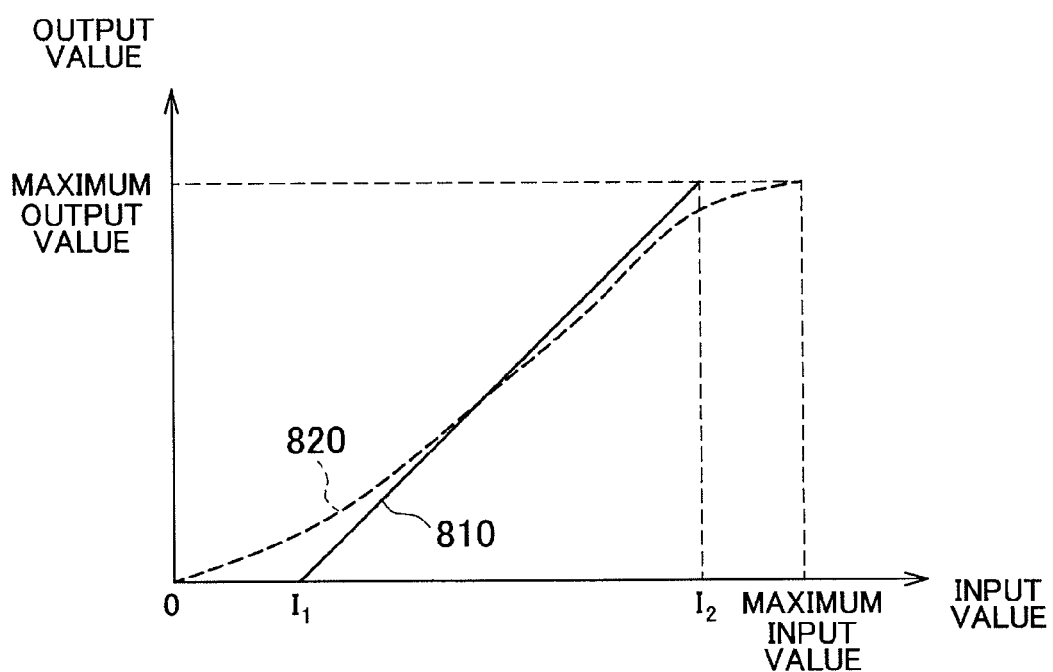
FIG. 8 is a view exemplary showing a gradation process by a gradation processing section 180.

FIG. 8 shows an example of a gradation process by the gradation processing section 180. In FIG. 8, the horizontal axis shows an input pixel value inputted to the gradation processing section 180 and the vertical axis shows an output pixel value outputted from the gradation processing section 180. The gradation processing section 180 converts the input pixel value into the output pixel value from zero to the maximum output value as shown in the drawing.

For example, when the high frequency transfer characteristic of the lens system 110 is low, the gradation processing section 180 converts an input pixel value into an output pixel value in accordance with input-output relation shown with the line 810. In this case, the intensity capable of being dissected is within a range from I1 to I2 shown by the input pixel value, and thus becomes narrower than a tonal range from the input 0 to the input maximum value. In this way, the gradation processing section 180 converts an input pixel value into a pixel value having a smaller dynamic range when the high frequency transfer characteristic of the lens system 110 is lower. In addition, when the high frequency transfer characteristic of the lens system 110 is low, the gradation processing section 180 may increase the inclination of the line indicating input-output relation, for example, within the range from I1 to I2 shown by the input pixel value. In this way, the gradation processing section 180 can assign to a middle gradation area a bit value per unit gradation larger than the other gradation areas.

On the other hand, when the high frequency transfer characteristic of the lens system 110 is high, the gradation processing section 180 converts an input pixel value into an output pixel value in accordance with input-output relation shown with the line 820. In this manner, the gradation processing section 180 does not change a dynamic range when the high frequency transfer characteristic of the lens system 110 is high. In addition, the input-output relation shown with the lines 810 and 820 may be determined in accordance with the characteristic of an output apparatus output from the output section 150.

In this way, the spatial frequency transfer characteristic identifying section 170 identifies the spatial frequency transfer characteristic of the image capturing section 105 on the basis of the spatial frequency component of the captured image captured by the image capturing section including the lens system 110. Then, the gradation processing section 180 converts the captured image into an image having a smaller dynamic range when the spatial frequency characteristic identified by the spatial frequency transfer characteristic identifying section 170 indicates a characteristic that the spread of light from the object point by the lens system 110 is larger.

Figure 9:
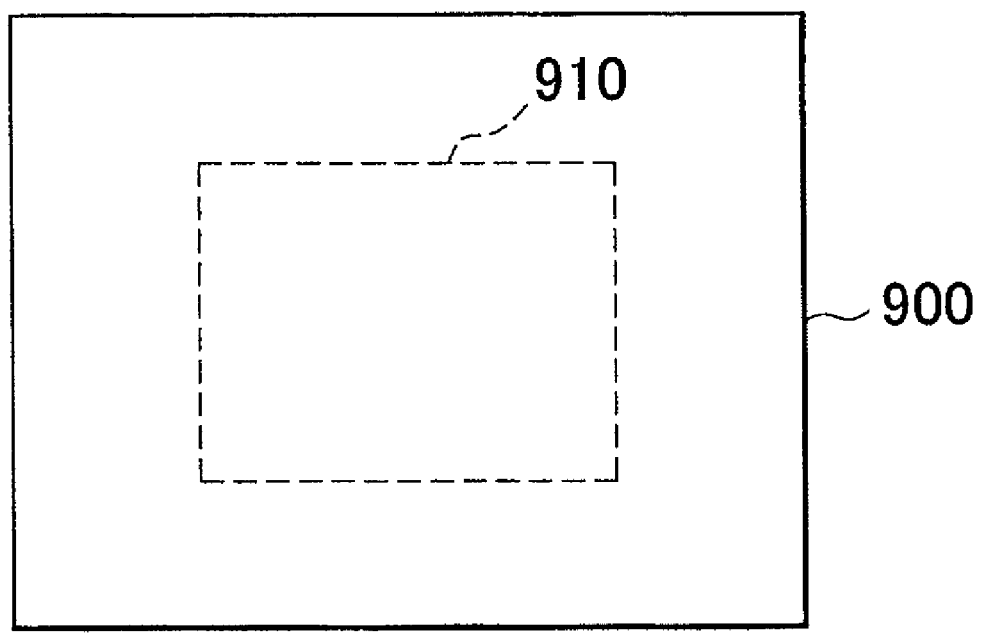
FIG. 9 is a view exemplary showing a partial region on which the gradation processing section 180 performs a gradation process.

FIG. 9 shows an example of a partial region on which the gradation processing section 180 performs a gradation process. The gradation processing section 180 performs a gradation process on an image after correction obtained by being corrected by the correction section 140 in regard to a specified partial region 910 in the captured image 900. On the other hand, the gradation processing section 180 performs a gradation process on an image obtained from the amount of light received by the light receiving element of the light receiving section 120, in other words, an image that is not corrected by the correction section 140, in regard to an area other than the specified partial region 910 in the captured image 900. When the image is converted into an image having a pixel value nonlinear to the amount of received light by performing the gradation process, the correction section 140 cannot appropriately perform a correction process based on an optical transfer function. However, the image capturing apparatus 104 can generate an image whose the blur by the lens system 110 is appropriately corrected because a correction process based on an optical transfer function is performed and then a gradation process is performed on the specified partial region 910. In this case, the specified partial region 910 may be a predetermined image area, or may be a partial region having a predetermined image characteristic amount.

Figure 10:
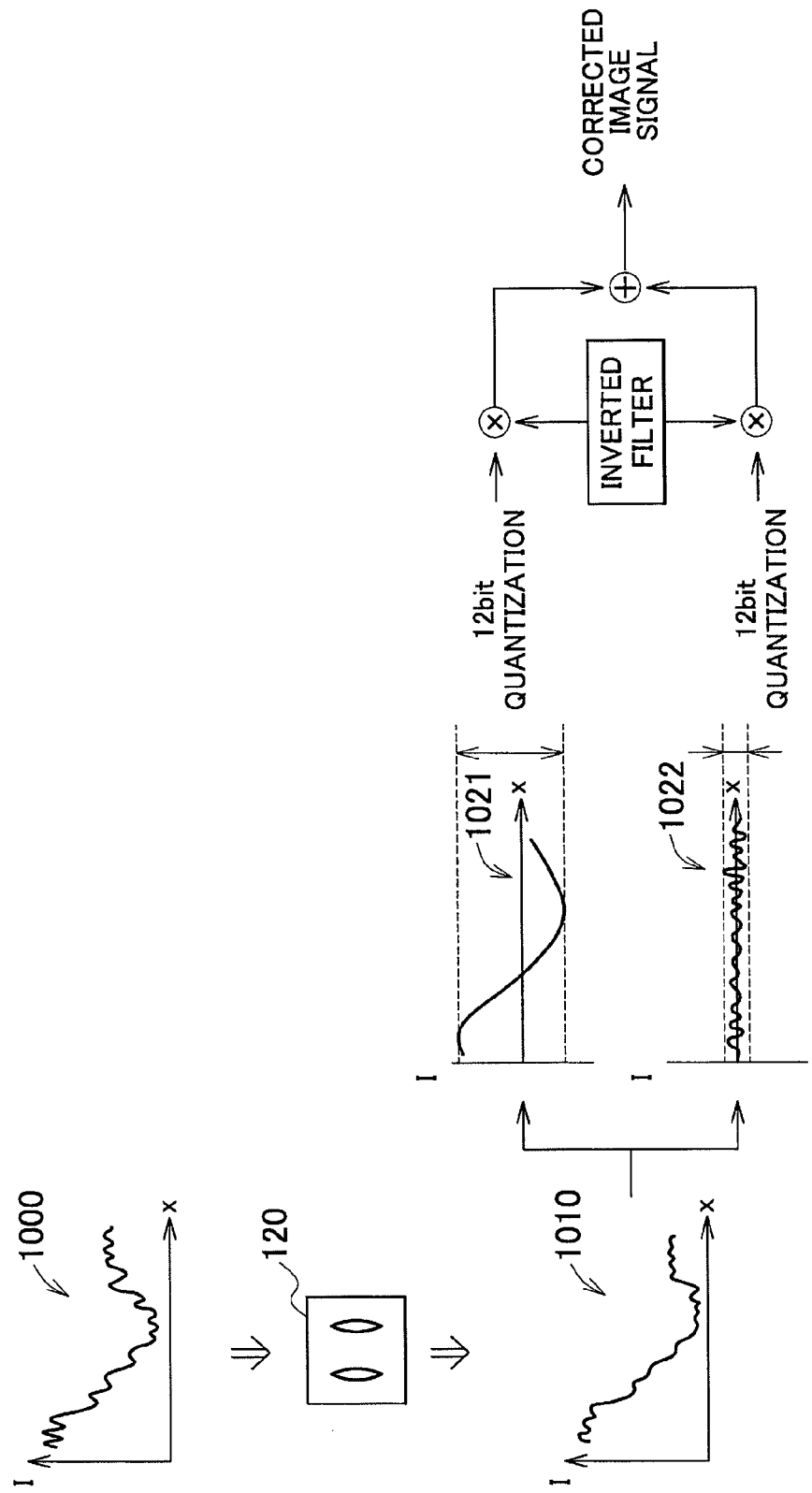
FIG. 10 is a view exemplary typically showing a processing matter in the gradation processing section 180 and a correction section 140.

FIG. 10 typically shows an example of a processing matter in the gradation processing section 180 and the correction section 140. At this time, the process in the gradation processing section 180 and the correction section 140 will be described with reference to the x direction component of an image signal.

An image signal 1010 conceptually shows an image signal that is obtained by passing light from a subject through the lens system 110 and then receiving the light using the light receiving section 120. An image signal 1000 conceptually shows an original image signal that is inputted into the image capturing apparatus 100 as light. According to the lens system 110 of the present embodiment, the light from the object point forms a blurred image. For this reason, the image signal 1010 is an image in which the signal component of the high spatial frequency domain of the image signal 1000 is largely reduced.

At this time, the gradation processing section 180 acquires the image signal 1010 quantized with 24 bits from the light receiving section 120. The gradation processing section 180 divides the image signal 1010 into a low frequency component 1021 that is an image signal of a low spatial frequency and a high frequency component 1022 that is an image signal of a high spatial frequency. In addition, FIG. 10 conceptually shows the low frequency component 1021 excepting a DC component. The amplitude of the high frequency component 1022 becomes smaller than that of the low frequency component 1021.

The gradation processing section 180 quantizes the low frequency component 1021 having a gradation width according to the amplitude of the low frequency component 1021 by means of 12-bit gradation, and supplies the quantized component to the correction section 140. In addition, the gradation processing section 180 quantizes the high frequency component 1022 having a gradation width according to the amplitude of the high frequency component 1022 by means of 12-bit gradation, and supplies the quantized component to the correction section 140. When the amplitude of the low frequency component 1021 is larger than that of the high frequency component 1022, the gradation processing section 180 quantizes the high frequency component 1022 by means of a quantization width smaller than that of the low frequency component 1021. In this manner the gradation processing section 140 quantizes the image component of the higher spatial frequency domain included in a captured image by means of a smaller quantization width, and thus converts the gradation of the captured image.

The correction section 140 corrects the low frequency component 1021 and the high frequency component 1022 every spatial frequency domain by means of an inverted filter or the like for the optical transfer function of the lens system 110. The correction section 140 then combines the corrected low frequency component 1021 and high frequency component 1022, and generates the obtained image signal as a correction image signal. In this case, the correction section 140 may combine a signal obtained by converting the high frequency component 1022 after correction into a 12-bit image signal and the low frequency component 1021 and thus generate the corrected image signal. The image signal corrected by the correction section 140 is returned to the gradation processing section 180, and various gradation processes including a process nonlinear to brightness are performed on the corrected image signal by the gradation processing section 180.

In addition, the quantization width by the gradation processing section 180 may be a value according to the spatial frequency transfer characteristic of the lens system 110. For example, the quantization width may be a value substantially inversely proportional to the MTF value of the lens system 110 corresponding to each spatial frequency domain. In this manner, the gradation processing section 180 may quantize the image component of the different spatial frequency domain included in a captured image by means of the quantization width according to the spatial frequency transfer characteristic of the lens system 110, and thus convert the gradation of the captured image. The gradation processing section 180 may also decompose the image signal 1010 into three or more image signals of the spatial frequency domain.

As described above, the image signal 1010 is largely reduced in the high spatial frequency domain compared to the low spatial frequency domain. In this case, a restoration process by an inverted filter or the like largely emphasizes the image signal of the high spatial frequency domain. For this reason, when restoring an image signal quantized with the same quantization width over all the spatial frequency domain, quantization noises may remarkable be increased in the high spatial frequency domain in some cases. However, according to the image capturing apparatus 100 of the present embodiment, since the gradation processing section 180 quantizes the image signal of the higher spatial frequency domain by means of a smaller quantization width and then restores the result, the increased amount of quantization noises before and after the restoration process may be reduced in some cases compared to restoring an image signal quantized with the same quantization width over all the spatial frequency domain.

Figure 11:
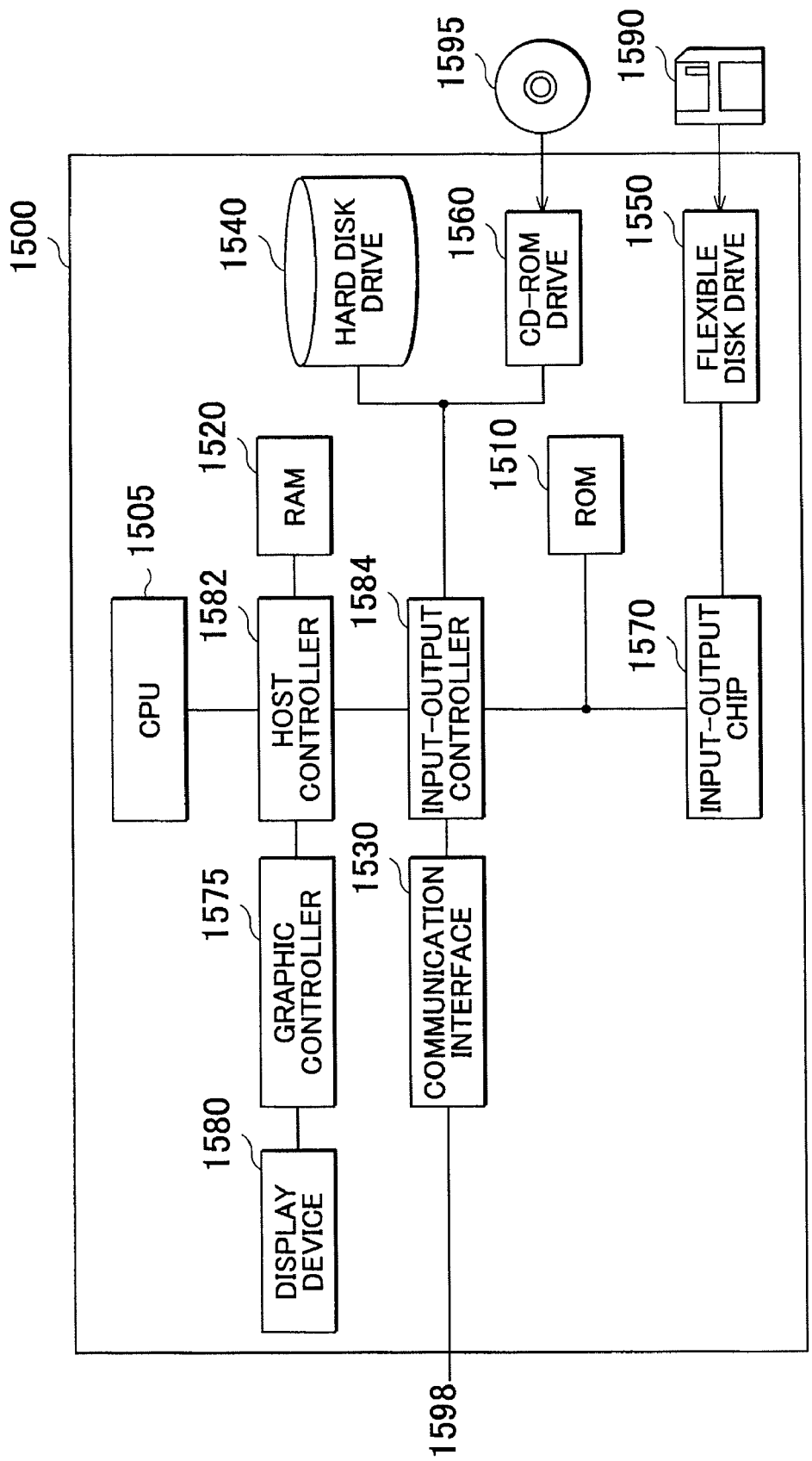
FIG. 11 is a view exemplary showing a hardware configuration of a computer 1500 functioning as the image capturing apparatus 104.

FIG. 11 is a view exemplary showing a hardware configuration of a computer 1500 functioning as the image capturing apparatus 104. The computer 1500 includes a CPU peripheral section, an input-output section, and a legacy input-output section. The CPU peripheral section has a CPU 1505, a RAM 1520, a graphic controller 1575, and a display device 1580 that are connected to one another by a host controller 1582. The input-output section has a communication interface 1530, a hard disk drive 1540, and a CD-ROM drive 1560 that are connected to the host controller 1582 by an input-output controller 1584. The legacy input-output section has a ROM 1510, a flexible disk drive 1550, and an input-output chip 1570 that are connected to the input-output controller 1584.

The host controller 1582 connects the RAM 1520 to the CPU 1505 and the graphic controller 1575 for accessing the RAM 1520 at high transfer rate. The CPU 1505 operates based on a program stored on the ROM 1510 and the RAM 1520 to control each section. The graphic controller 1575 acquires image data generated by the CPU 1505 on a frame buffer provided in the RAM 1520, and displays the data on the display device 1580. Alternatively, the graphic controller 1575 may include therein the frame buffer storing image data generated by the CPU 1505 or the like.

The input-output controller 1584 connects the host controller 1582 to the communication interface 1530, the hard disk drive 1540, and the CD-ROM drive 1560 that are a comparatively fast input-output apparatus. The hard disk drive 1540 stores a program and data to be used by the CPU 1505. The communication interface 1530 is connected to a network apparatus 1598 to send and receive a program or data. The CD-ROM drive 1560 reads a program or data from a CD-ROM 1595, and provides the program or data to the hard disk drive 1540 and the communication interface 1530 via the RAM 1520.

The ROM 1510, the flexible disk drive 1550, and the input-output chip 1570 that are a comparatively low-speed input-output apparatus are connected to the input-output controller 1584. The ROM 1510 stores a boot program to be executed during starting the computer 1500, a program dependent on the hardware of the computer 1500, or the like. The flexible disk drive 1550 reads a program or data from a flexible disk 1590, and provides the program or data to the hard disk drive 1540 and the communication interface 1530 via the RAM 1520. The input-output chip 1570 connects the flexible disk drive 1550 to various kinds of input-output apparatuses via a parallel port, a serial port, a keyboard port, a mouse port, or the like.

A program executed by the CPU 1505 is stored on a recording medium such as the flexible disk 1590, the CD-ROM 1595, or an IC card in order to be provided by a user. The program stored on the recording medium may be compressed or may not be compressed. The program is read from the recording medium, is installed in the hard disk drive 1540, and is executed by the CPU 1505 via the RAM 1520. The program executed by the CPU 1505 makes the computer 1500 function as the light receiving section 120, the image generating section 160 or each component included in the image generating section 160, and the output section 150 that are described with reference to FIGS. 1 to 10.

A program described above may be stored on an outside storage medium. The storage medium can include an optical recording medium such as DVD or PD, a magneto-optical recording medium such as MD, a tape medium, a semiconductor memory such as an IC card in addition to the flexible disk 1590 and the CD-ROM 1595. In addition, a program is provided to the computer 1500 via network using a storage device such as a hard disk or RAM provided in a server system connected to private communication network or Internet as the recording medium. In this way, the computer 1500 such as an electronic data processing apparatus controlled by the program functions as the image capturing apparatus 104.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

What is claimed is:

1. An image capturing apparatus comprising a gradation processing section that converts gradation of a captured image captured through an optical system forming an image of light in accordance with a spatial frequency transfer characteristic of the optical system, further comprising a light receiving section that receives light from a subject through the optical system, wherein
   the gradation processing section converts the gradation of the captured image obtained by the light received by the light receiving section in accordance with the spatial frequency transfer characteristic at a position at which the light receiving section is provided, wherein the gradation processing section converts the captured image into an image having a dynamic range having a size determined by the spatial frequency transfer characteristic.

2. The image capturing apparatus according to claim 1, wherein the gradation processing section converts the captured image into an image having a smaller dynamic range when the spatial frequency transfer characteristic in a high frequency domain is lowered from a previously determined special frequency transfer characteristic.

3. The image capturing apparatus according to claim 2, further comprising a spatial frequency transfer characteristic identifying section that acquires information indicating a spatial frequency transfer characteristic of the optical system and identifies a spatial frequency transfer characteristic of the optical system, wherein the gradation processing section converts the captured image into an image having a smaller dynamic range when the spatial frequency transfer characteristic identified by the spatial frequency transfer characteristic identifying section is lowered in the high frequency domain from a previously determined spatial frequency transfer characteristic.

4. The image capturing apparatus according to claim 3, further comprising a mounting section to and from which the optical system is attached and detached, wherein the spatial frequency transfer characteristic identifying section acquires information indicating a spatial frequency transfer characteristic of the optical system mounted on the mounting section.

5. The image capturing apparatus according to claim 4, wherein the spatial frequency transfer characteristic identifying section acquires from the optical system the information indicating the spatial frequency transfer characteristic of the optical system mounted on the mounting section and identifies the spatial frequency transfer characteristic of the optical system.

6. The image capturing apparatus according to claim 2, wherein the gradation processing section performs a gamma correction on the captured image in order to convert the captured image into an image having a smaller dynamic range when the spatial frequency transfer characteristic in the high frequency domain is lower.

7. The image capturing apparatus according to claim 2, further comprising the optical system.

8. The image capturing apparatus according to claim 7, wherein the optical system spreads light from an object point to have a substantially uniform size in the light receiving section regardless of the distance between the optical system and the object point and sets an optical transfer function of the optical system to the light from the object point to be substantially uniform regardless of the distance between the optical system and the object point, and the gradation processing section converts the captured image into an image having a smaller dynamic range when the optical system spreads the light from the object point to be larger than a previous spread of light from the object point.

9. The image capturing apparatus according to claim 8, wherein the optical system spreads the light from the object point to have a size larger than a pitch of a plurality of light receiving elements included in the light receiving section regardless of the distance between the optical system and the object point.

10. An image capturing apparatus comprising a gradation processing section that converts gradation of a captured image captured through an optical system forming an image of light in accordance with a spatial frequency transfer characteristic of the optical system, wherein the gradation processing section quantizes an image component of a different spatial frequency domain included in the captured image in quantization width according to the spatial frequency transfer characteristic of the optical system.

11. The image capturing apparatus according to claim 10, wherein the gradation processing section quantizes an image component of a higher spatial frequency domain included in the captured image in smaller quantization width.

12. An image capturing method comprising converting gradation of a captured image captured through an optical system forming an image of light in accordance with a spatial frequency transfer characteristic of the optical system further comprising receiving light from a subject through the optical system, gradation processing including converting the gradation of the captured image obtained by the light received during light receiving in accordance with a spatial frequency transfer characteristic at a position at which the light receiving is provided; and wherein the gradation processing further includes converting the captured image into an image having a dynamic range having a size determined by the spatial frequency transfer characteristic.

13. A computer readable medium storing a program for an image capturing apparatus, the program making a computer functions as a gradation processing section that converts gradation of a captured image captured through an optical system forming an image of light in accordance with a spatial frequency transfer characteristic of the optical system, further causing the computer to function as a light receiving section that receives light from a subject through the optical system, wherein the gradation processing section converts the gradation of the captured image obtained by the light received by the light receiving section in accordance with the spatial frequency transfer characteristic at a position at which the light receiving section is provided; and wherein the gradation processing section converts the captured image into an image having a dynamic range having a size determined by the spatial frequency transfer characteristic.

14. An image processing apparatus comprising:

a spatial frequency transfer characteristic identifying section that identifies a spatial frequency transfer characteristic of an image capturing section on the basis of a spatial frequency component of a captured image captured by the image capturing section; and a gradation processing section that converts gradation of the captured image in accordance with the spatial frequency transfer characteristic identified by the spatial frequency transfer characteristic identifying section, wherein the gradation processing section converts the captured image into an image having a dynamic range having a size determined by the spatial frequency transfer characteristic.

15. The image processing apparatus according to claim 14, wherein the gradation processing section converts the captured image into an image having a smaller dynamic range when the spatial frequency transfer characteristic identified by the spatial frequency transfer characteristic identifying section in a high frequency domain is lowered from a previously determined spatial frequency transfer characteristic.

16. The image processing apparatus according to claim 14, wherein the spatial frequency transfer characteristic identifying section identifies the spatial frequency transfer characteristic as being higher when a higher spatial frequency component of the captured image is larger than a higher spatial frequency component of a previously captured image.

17. The image processing apparatus according to claim 14, wherein the spatial frequency transfer characteristic identifying section identifies the spatial frequency transfer characteristic as being higher when a spatial frequency component of a predetermined high frequency domain in the captured image is larger than that of a predetermined low frequency domain.

18. The image processing apparatus according to claim 14, wherein the spatial frequency transfer characteristic identifying section identifies the spatial frequency transfer characteristic of the image capturing section on the basis of the spatial frequency component of the captured image captured by the image capturing section including an optical system that spreads light from an object point to have a substantially uniform size regardless of the distance between the image optical system and the object point and thus sets an optical transfer function to the light from the object point to be substantially uniform regardless of the distance between the optical system and the object point, and the gradation processing section converts the captured image into an image having a smaller dynamic range when the spatial frequency characteristic identified by the spatial frequency transfer characteristic identifying section indicates a characteristic that the spread of light from the object point by the optical system is larger than a spread of light from the object point.

19. An image processing apparatus comprising:

a spatial frequency transfer characteristic identifying section that identifies a spatial frequency transfer characteristic of an image capturing section on the basis of a spatial frequency component of a captured image captured by the image capturing section; and a gradation processing section that converts gradation of the captured image in accordance with the spatial frequency transfer characteristic identified by the spatial frequency transfer characteristic identifying section, wherein the gradation processing section quantizes an image component of a different spatial frequency domain included in the captured image in quantization width according to the spatial frequency transfer characteristic identified by the spatial frequency transfer characteristic identifying section.

20. The image processing apparatus according to claim 19, wherein the gradation processing section quantizes an image component of a higher spatial frequency domain included in the captured image in smaller quantization width.

21. An image processing method comprising:

identifying a spatial frequency transfer characteristic of an image capturing section on the basis of a spatial frequency component of a captured image captured by the image capturing section; and converting gradation of the captured image in accordance with the spatial frequency transfer characteristic identified in the spatial frequency transfer characteristic identifying step; and wherein converting gradation includes converting the captured image into an image having a dynamic range having a size determined by the spatial frequency transfer characteristic.

22. A computer readable medium storing a program for an image processing apparatus, the program making a computer function as:

a spatial frequency transfer characteristic identifying section that identifies a spatial frequency transfer characteristic of an image capturing section on the basis of a spatial frequency component of a captured image captured by the image capturing section; and a gradation processing section that converts gradation of the captured image in accordance with the spatial frequency transfer characteristic identified by the spatial frequency transfer characteristic identifying section; and wherein the gradation processing section converts the captured image into an image having a dynamic range having a size determined by the spatial frequency transfer characteristic.

23. An image capturing method comprising converting gradation of a captured image captured through an optical system forming an image of light in accordance with a spatial frequency transfer characteristic of the optical system further comprising receiving light from a subject through the optical system, gradation processing including converting a gradation of the captured image obtained by the light received in the light receiving in accordance with the spatial frequency transfer characteristic at a position at which the light receiving is provided; and wherein the gradation processing further includes converting the captured image into an image having a dynamic range having a size determined by the spatial frequency transfer characteristic; and wherein the gradation processing includes quantizing an image component of a different spatial frequency domain included in the captured image in quantization width according to the spatial frequency transfer characteristic of the optical system.

24. A computer readable medium storing a program for an image capturing apparatus, the program making a computer functions as a gradation processing section that converts gradation of a captured image captured through an optical system forming an image of light in accordance with a spatial frequency transfer characteristic of the optical system, further causing the computer to function as a light receiving section that receives light from a subject through the optical system, wherein the gradation processing section converts the gradation of the captured image obtained by the light received by the light receiving section in accordance with the spatial frequency transfer characteristic at a position at which the light receiving section is provided; and wherein the gradation processing section converts the captured image into an image having a dynamic range having a size determined by the spatial frequency transfer characteristic; and wherein the gradation processing section quantizes an image component of a different spatial frequency domain included in the captured image in quantization width according to the spatial frequency transfer characteristic of the optical system.

25. An image processing method comprising:

identifying a spatial frequency transfer characteristic of an image capturing section on the basis of a spatial frequency component of a captured image captured by the image capturing section; and converting gradation of the captured image in accordance with the spatial frequency transfer characteristic identified in the spatial frequency transfer characteristic identifying step; and wherein the converting gradation includes converting the captured image into an image having a dynamic range having a size determined by the spatial frequency transfer characteristic; and wherein the converting gradation quantizes an image component of a different spatial frequency domain included in the captured image in quantization width according to the spatial frequency transfer characteristic identified by the spatial frequency transfer characteristic identifying section.

26. A computer readable medium storing a program for an image processing apparatus, the program making a computer function as:
- a spatial frequency transfer characteristic identifying section that identifies a spatial frequency transfer characteristic of an image capturing section on the basis of a spatial frequency component of a captured image captured by the image capturing section; and
- a gradation processing section that converts gradation of the captured image in accordance with the spatial frequency transfer characteristic identified by the spatial frequency transfer characteristic identifying section; and wherein the gradation processing section converts the captured image into an image having a dynamic range having a size determined by the spatial frequency transfer characteristic; and wherein the gradation processing section quantizes an image component of a different spatial frequency domain included in the captured image in quantization width according to the spatial frequency transfer characteristic identified by the spatial frequency transfer characteristic identifying section.

* * * * *